United States Patent [19]

Suzuki

[11] Patent Number: 5,617,433
[45] Date of Patent: Apr. 1, 1997

[54] SERIAL DATA TRANSFER APPARATUS

[75] Inventor: Katsunori Suzuki, Itami, Japan

[73] Assignee: Mitsubishi Denki Kabushiki Kaisha, Tokyo, Japan

[21] Appl. No.: 268,582

[22] Filed: Jun. 30, 1994

[30] Foreign Application Priority Data

Jun. 30, 1993 [JP] Japan ................. 5-160946

[51] Int. Cl.⁶ ................. G06F 11/00
[52] U.S. Cl. ................. 371/48; 395/185.02
[58] Field of Search ................. 371/48; 395/185.02

[56] References Cited

U.S. PATENT DOCUMENTS

| | | | |
|---|---|---|---|
| 4,346,440 | 8/1982 | Kyu et al. | 395/200.2 |
| 4,823,312 | 4/1989 | Michael et al. | 395/250 |
| 4,949,333 | 8/1990 | Gulick et al. | 370/32 |
| 5,151,999 | 9/1992 | Marzucco et al. | 395/800 |
| 5,361,374 | 11/1994 | Sasaki et al. | 395/800 |

OTHER PUBLICATIONS

"Mitsubishi One–Chip Microcomputer User's Manual", Jul. 1991, pp. 2–160–2–147.

Primary Examiner—Stephen M. Baker
Attorney, Agent, or Firm—Lowe, Price, LeBlanc & Becker

[57] ABSTRACT

A serial data transfer apparatus includes a receiving shifter 107 for receiving serial data, and storing each bit thereof while shifting them to convert the received serial data into parallel data; a control register 102 for controlling the permission of receiving operation; a status register 103 for storing the error information of receive data; and a reset signal generating circuit 108 for clearing the contents of the status register 103 regardless of set/reset of a receiving permission bit. The serial data transfer apparatus is configured so that even where the receiving permission bit of the control register 102 is reset to "0", the reset signal RESET of the status register 103 is not generated, whereby the information of the status register 103 is protected from being destroyed.

6 Claims, 13 Drawing Sheets

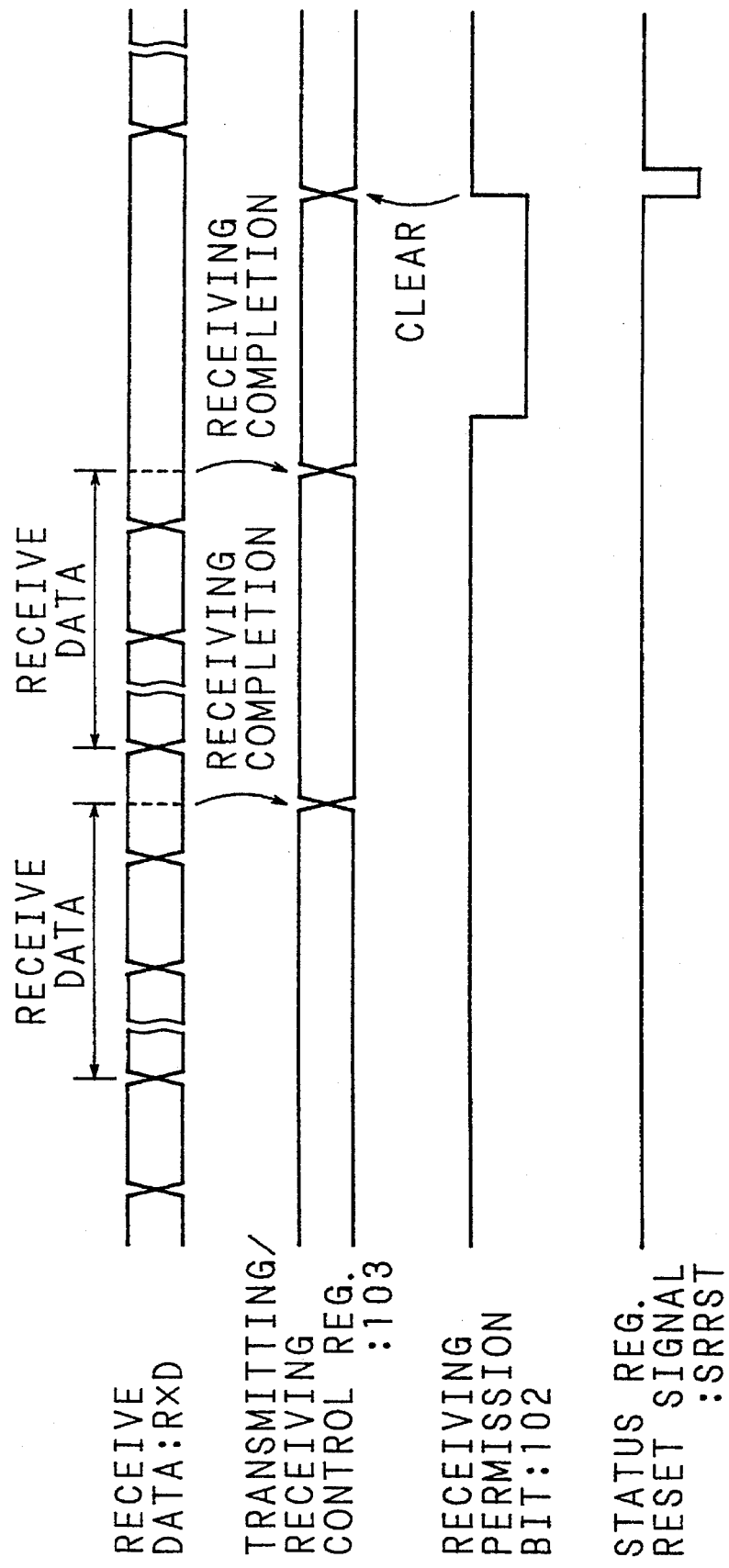

SERIAL DATA TRANSFER APPARATUS

BACKGROUND OF THE INVENTION

1. Field of the Invention

The present invention relates to a serial data transfer apparatus for converting parallel data into serial data for transmitting/receiving, and more particularly, to a control in setting/resetting a receiving permission bit thereof.

2. Description of the Related Art

Conventional data transfer apparatus starts its receiving operation when a receiving permission bit is set, and completes its receiving operation when a receiving permission bit is reset.

As an example of such conventional data transfer apparatus, a serial data transfer function included in the M37720 which is a single-chip microcomputer manufactured by Mitsubishi Electric Corporation will be explained on the basis of "Mitsubishi One-Chip Microcomputer User's Manual (July, 1991)".

FIG. 1 is a block diagram showing a configuration of the above-mentioned single-chip microcomputer M37720.

In FIG. 1, reference numeral 701 designates an odd side of data bus; numeral 702, an even side of the data bus; numeral 703, a receiving buffer register; and numeral 704, a receiving register.

The receiving register 704, which is connected to a receiving terminal RxDi, takes in received data in synchronism with a receiving clock given from a receiving control register 707 and gives the data to the receiving buffer register 703. The receiving buffer register 703, which is connected to the data buses 701 and 702, outputs the received data to them.

Reference numeral 705 designates a transmit register; numeral 706, a transmit buffer register; numeral 707, a receiving control register; numeral 708, a transmit control circuit; numeral 709, a 16-frequency dividing circuit; numeral 710, a 2-frequency dividing circuit; and numeral 711, a baud rate generator.

The transmit buffer register 706, which is connected with the data buses 701 and 702, holds the transmit data given from the data buses 701 and 702. The transmit register 705, to which a transmit clock is given from the transmit control circuit 708, reads the transmit data held by the transmit buffer register 706 in synchronism with the transmit clock, and transmits the data from a transmit terminal TxDi to the outside.

The baud rate generator 711 and frequency dividing circuits 709, 710 are used to set a baud rate in transferring data, in other words, to set the frequency of the transmitting/receiving clock.

FIG. 2 is a schematic diagram showing the function of a transmitting/receiving register 800.

The transmitting/receiving register 800 consists of 8 bits, b7 through b0.

In FIG. 2, reference numeral 801 designates an errorsome flag; numeral 802, a parity error flag; numeral 803, a framing error flag; numeral 804, an overrun error flag; numeral 805, a receiving completion flag; numeral 806, a receiving permission bit; numeral 807, a transmit buffer empty flag; and numeral 808, a transmit permission bit.

The errorsome flag 801 represents the presence/absence of error; the parity error flag 802, the presence/absence of parity error; the framing error flag 803, the presence/absence of framing error; the overrun error flag 804, the presence/absence of overrun error; the receiving completion flag 805, the presence/absence of the receive data in the receiving buffer register 703; the receiving permission bit 806, the inhibition/permission of receiving; the transmit buffer empty flag 807, the presence/absence of the transmit data in the transmit buffer register 706; and the transmit permission bit 808, the inhibition/permission of transmit.

The bits 801 through 808 of the transmitting/receiving register 800 are set/reset in the described manner. However, in resetting the transmitting/receiving register 800, all 8 bits are simultaneously reset to "0".

FIG. 3 is a schematic diagram showing a function of a transmitting/receiving mode register 900 of the block diagram also shown in FIG. 1.

The transmitting/receiving mode register 900 consists of 8 bits, b7 through b0.

In FIG. 3, reference numeral 901 designates a sleep select bit; numeral 902, a parity permission bit; numeral 903, a parity odd/even select bit; numeral 904, a stop bit length select bit; numeral 905, an internal/external clock select bit; and numerals 906 through 908, serial I/O mode select bits.

The sleep select bit 901 sets the invalid/valid of sleep function; the parity permission bit 902, the inhibition/permission of parity; the parity odd/even select bit 903, the odd number/even number of parity; the stop bit length select bit 904, 1 bit/2 bits of stop bit; the internal/external clock select bit 905, internal clock/external clock; and the serial I/O mode select bits 906 through 908 set serial I/O modes.

With reference to a timing chart of FIG. 4 showing an operating state, the receiving operation of the conventional data transfer apparatus as described above will be explained hereinafter.

At first, before the apparatus starts receiving, each bit of the transmitting/receiving mode register 900 is set by the CPU not shown. Specifically, performed are the internal/external clock selection of reference clock, stop bit length selection, parity odd/even selection, parity permission, and sleep selection. A positive integer value "n" is set to the baud rate generator 711.

Then, when the transmit permission bit 808 of the transmitting/receiving register 800 is set, the input of transfer data becomes possible, so that when a start bit is inputted from the receiving terminal RxDi, receiving is started. Subsequently the receive data RxD, and finally the stop bit are inputted.

When the stop bit is inputted, the completion of the receive data is detected, thereby causing the receiving completion flag 805 of the transmitting/receiving register 800 to be set.

Where upon the completion of receive, parity error, framing error, or overrun error is detected, the parity error flag 802, the framing error flag 803, or the overrun error flag 804 are set, respectively. Further, where either off those errors occurs, the errorsome flag 801 is set.

Now, in the serial data transfer function of the single-chip microcomputer M37720 as an example of conventional data transfer apparatus as described above, at the same time when the receiving permission bit 806 of the transmitting/receiving register 800 is reset to "0", the receiving completion flag 805, the parity error flag 802, the framing error flag 803 and the overrun error flag 804 are also cleared to "0". This procedure is shown in the timing chart of FIG. 4.

In the conventional data transfer apparatus as described above, a problem has existed in that where the receiving permission bit 806 is reset to "0" before the receiving completion flag 805, the parity error flag 802, the framing error flag 803 and the overrun error flag 804 of the transmitting/receiving register 800 are read, all the above-mentioned flags are cleared to "0".

The present invention is made in view of such circumstances, and it is an object of the invention to provide a serial data transfer apparatus by which the resetting of the transmit permission or receiving permission bit can be performed independently of the clearing of the transmit or receiving status so that where the transmit permission or the receiving permission is disabled, the status flag of transmit or the status flag of receiving is not cleared.

SUMMARY OF THE INVENTION

A serial data transfer apparatus in connection with the present invention includes a first storing means (receiving shifter 107) for storing each bit of received serial data while sequentially shifting them to convert the serial data to parallel data; a second storing means (control register 102) for storing information for permitting data to be received; an error detecting means (status signal generating unit 104) for detecting the error information of received data; a third storing means (status register 103) for storing the error information detected by the error detecting means (status signal generating unit 104); a first controlling means (receiving control register 109) for controlling the third storing means (status register 103) to allow the error information to be stored; and an initializing means (reset signal generating circuit 108) for initializing the stored values of the third storing means (status register 103). The initializing means (reset signal generating circuit 108) is configured so as to reset the stored values of the third storing means (status register 103) independently of resetting the stored values of the second storing means control register 102).

Also, the serial data transfer apparatus of the present invention includes a first storing means (receiving shifter 107) for storing each bit of received serial data while sequentially shifting them to convert the serial data to parallel data; a second storing means (control register 102) for storing information for permitting data to be received; an error detecting means (status signal generating unit 104) for detecting the error information of received data; a third storing means (status register 103) for storing the error information detected by the error detecting means (status signal generating unit 104); a first controlling means (receiving control register 109) for controlling the third storing means(status register 103) to allow the error information to be stored; and an initializing means (reset signal generating circuit 601) for initializing the stored values of the third storing means (status register 103). The initializing means (reset signal generating circuit 601) is configured so that the means includes a receiving permission detecting means (603) which detects the fact that the second storing means (control register 102) stores the information indicating receiving permission, and initializes the stored values of the third storing means (status register 103), where the receiving permission detecting means (603) detects the fact that the second storing means (control register 102) has stored the information indicating receiving permission.

Further, the serial data transfer apparatus of the present invention comprises initializing means having both functions of the above-mentioned reset signal generating circuits 108 and 601.

In the serial data transfer apparatus of the present invention, when the transmit permission or the receiving permission is disabled, the status flag of transmit or the status flag of receiving is not cleared. Therefore, the resetting of the transmit permission or receiving permission bit can be controlled independently of the resetting of the transmit or receiving status.

The above and further objects and features of the invention will more fully be apparent from the following detailed description with accompanying drawings.

BRIEF DESCRIPTION OF THE DRAWINGS

FIG. 13 is a timing chart showing an operating state of the second embodiment of the serial data transfer apparatus of the present invention.

DESCRIPTION OF THE PREFERRED EMBODIMENTS

[First Embodiment]

With reference to drawings showing embodiments, the present invention will be explained hereinafter.

FIG. 5 through FIG. 9 are drawings showing a first embodiment of the present invention.

Figure 1:
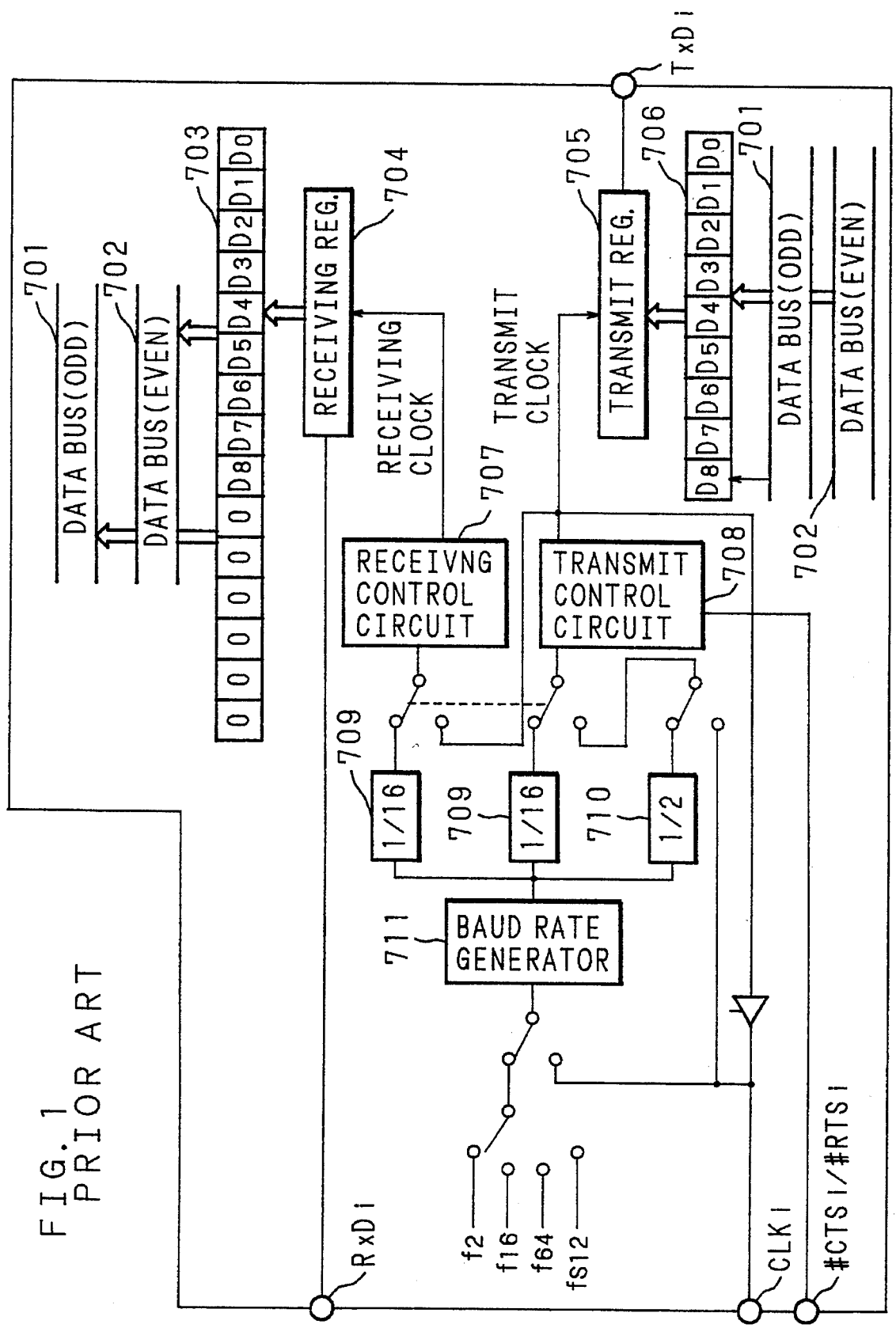
FIG. 1 is a block diagram showing a configuration example of conventional serial data transfer apparatus.
Figure 2:
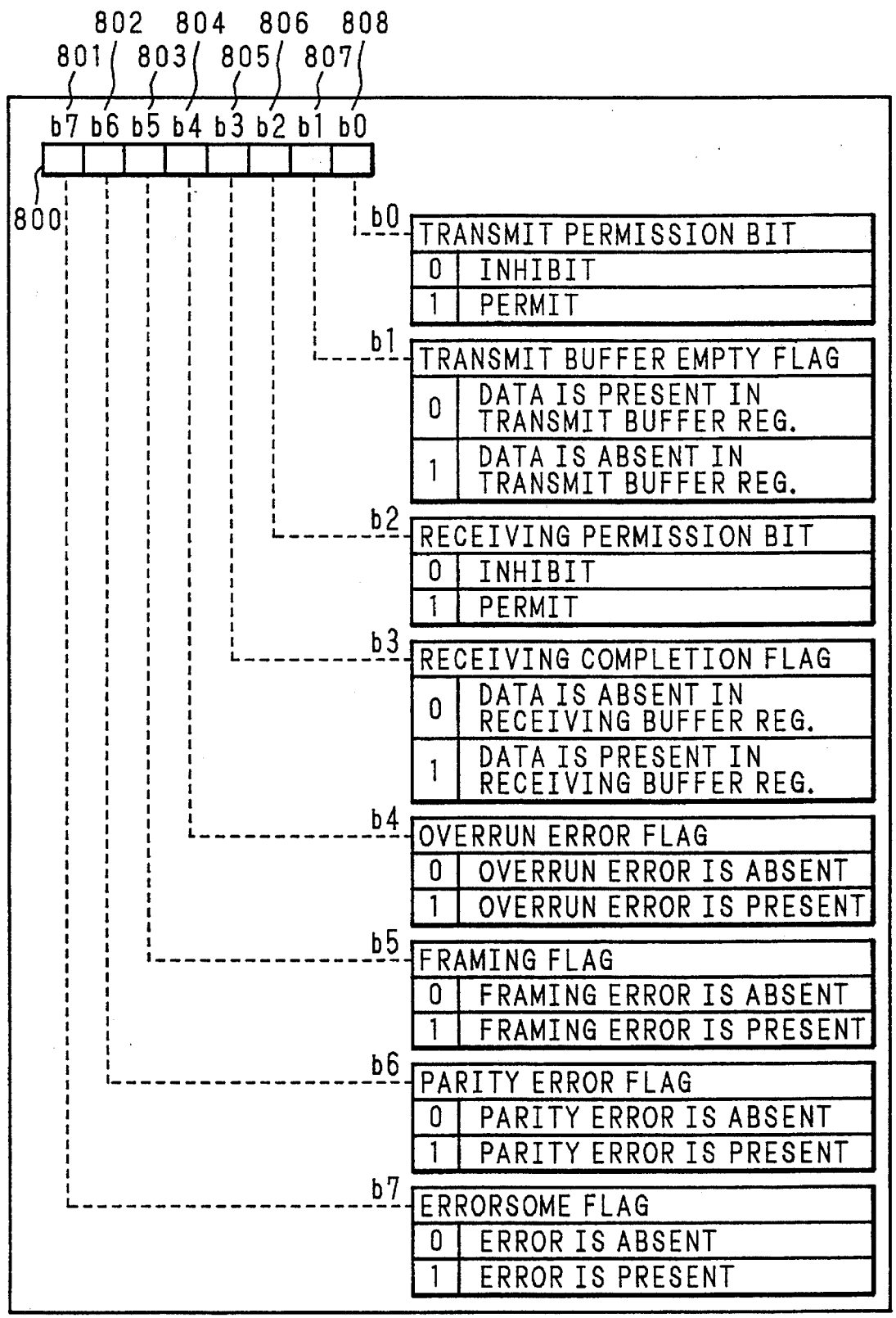
FIG. 2 is a schematic diagram showing a function of a control register having the configuration shown in FIG. 1.
Figure 3:
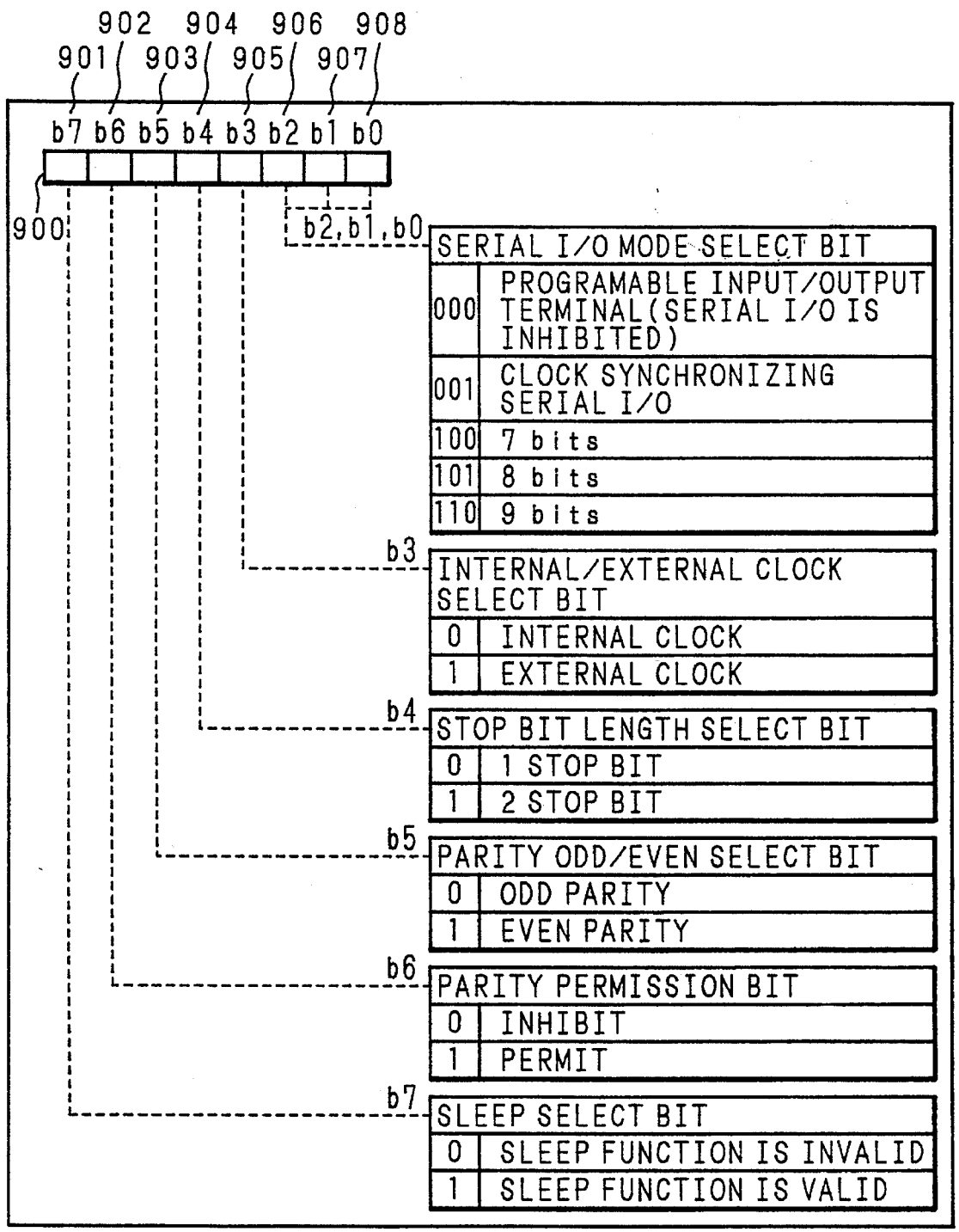
FIG. 3 is a schematic diagram showing a function of a mode register having the configuration shown in FIG. 1.
Figure 4:
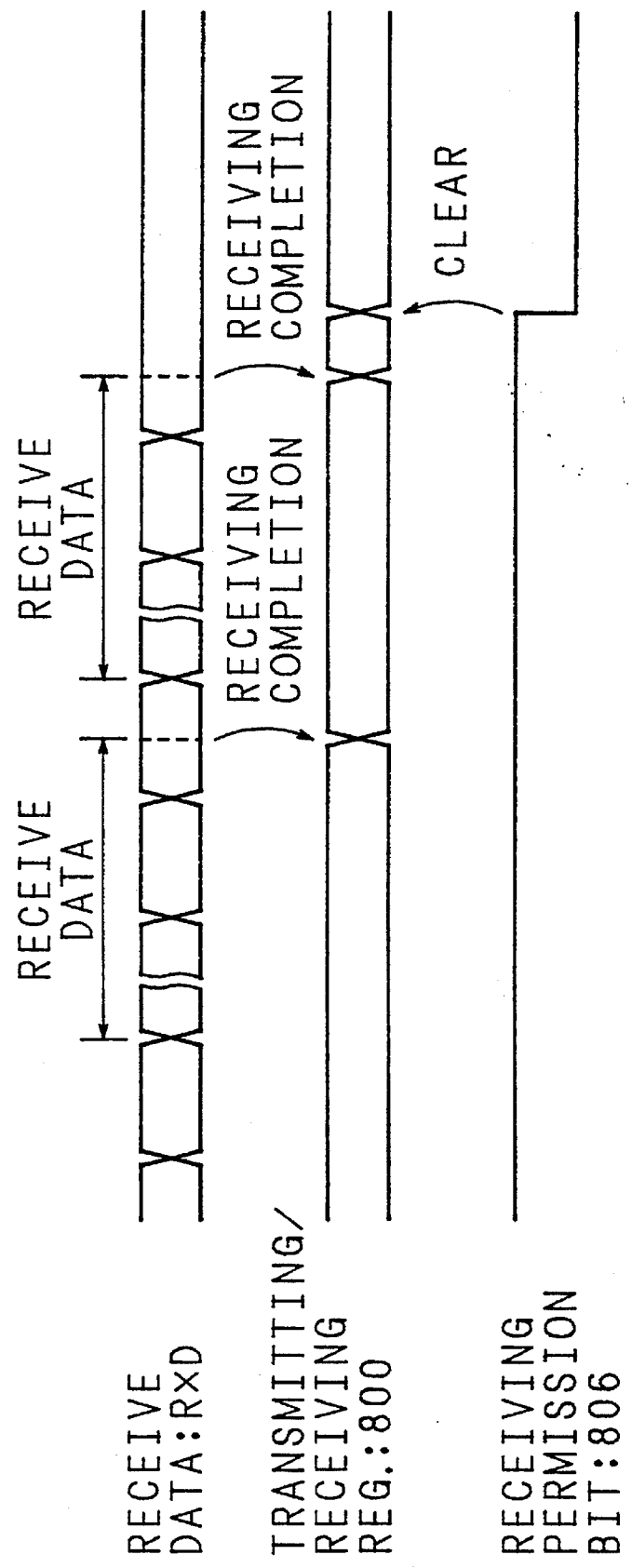
FIG. 4 is a timing chart showing an operating state of the prior art.
Figure 5:
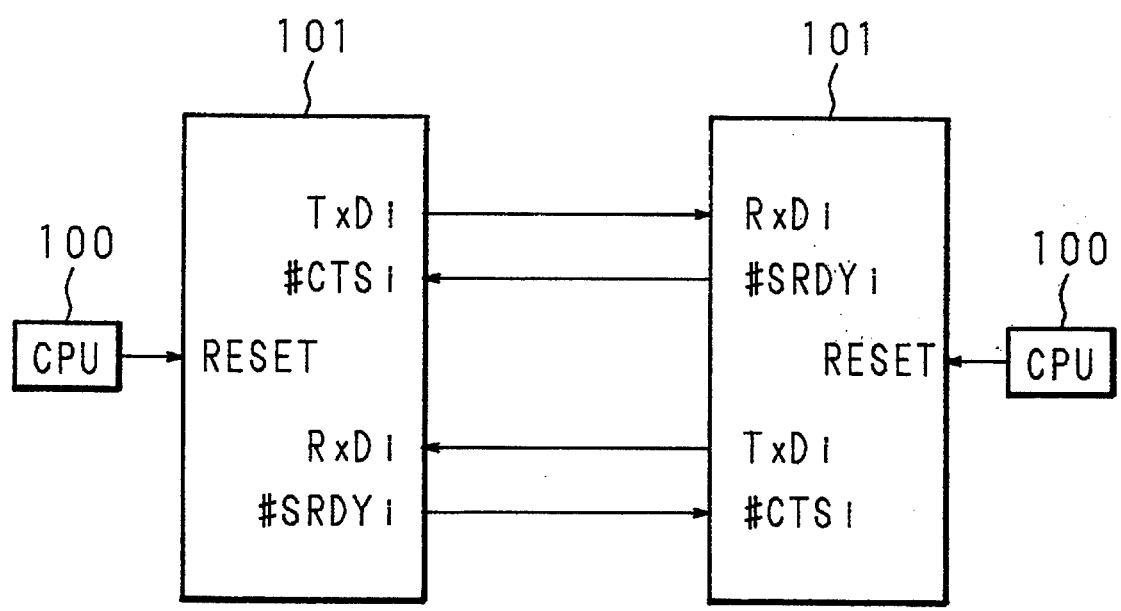
FIG. 5 is a block diagram showing a mutual connecting state of serial data transfer apparatus of the present invention.

FIG. 5 is a schematic diagram showing a state in which serial data transfer apparatus 101 of the present invention are mutually connected.

Both of the serial data transfer apparatuses 101 are reset by a signal RESETs from respective CPU 100. Data is outputted from a transmit terminal TxDi of one serial data transfer apparatus 101 and inputted into a receiving terminal RxDi of the other serial data transfer apparatus 101, while a transmit request signal, as handshaking is outputted from a terminal #SRDY of one serial data transfer apparatus 101 and inputted into a terminal #CTS of the other serial data transfer apparatus 101.

Figure 6:
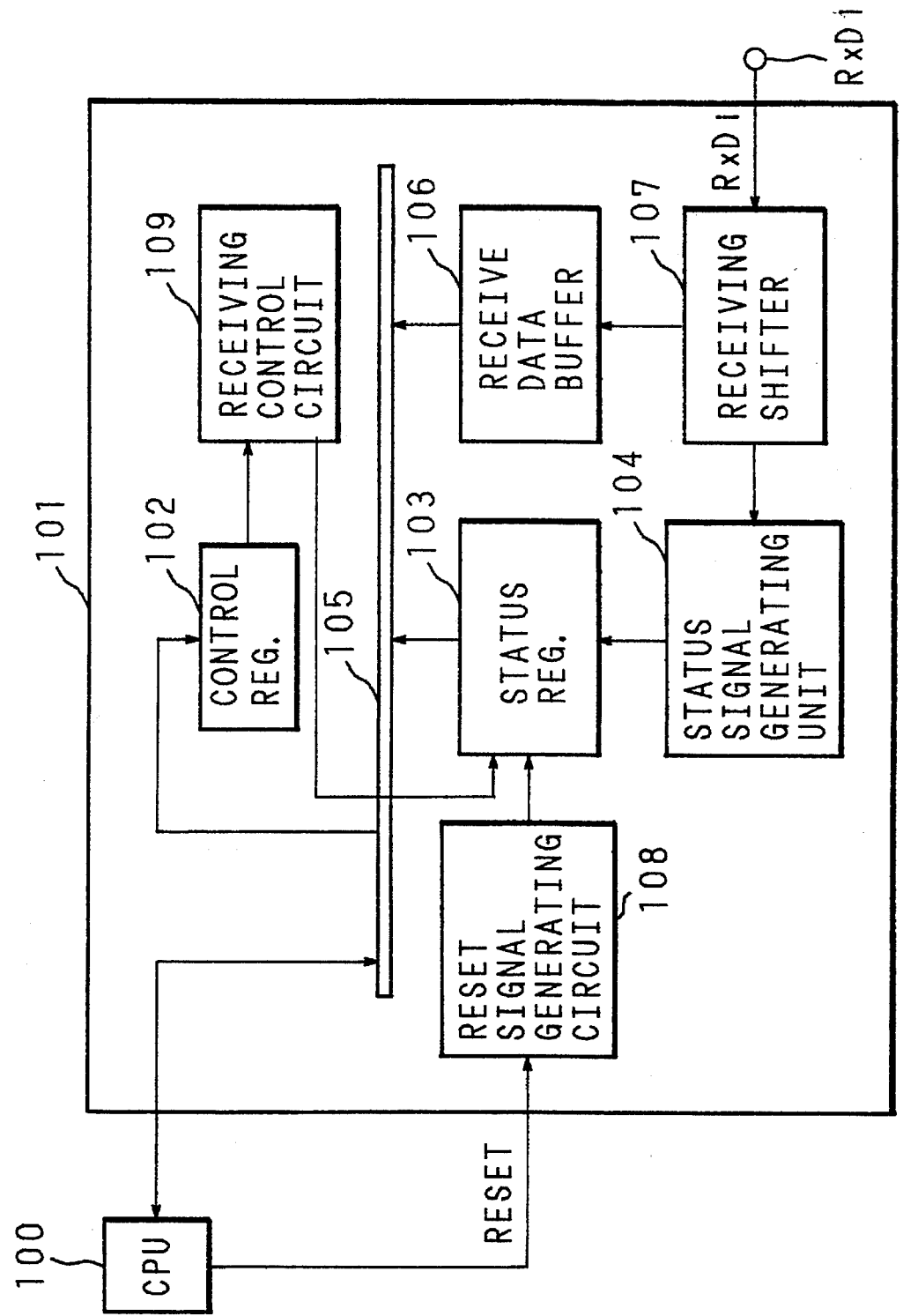
FIG. 6 is a block diagram of principal portion showing a configuration example of a first embodiment of a serial data transfer apparatus of the present invention.

FIG. 6 is a block diagram showing an internal configuration of one embodiment of the serial data transfer apparatus 101 of the present invention.

In FIG. 6, reference numeral 102 designates a control register for setting a receiving permission bit according to an instruction from the CPU 100; and numeral 109, a receiving control register for controlling the read/write of a status register 103, described later, under control of the control register 102.

The status register 103, whose detailed configuration will be described later, functions as a flag for storing the error contents of receive data at the completion of receiving.

Reference numeral 105 designates a data bus for reading/writing the data stored in a receive data buffer 106.

Reference numeral 107 designates a receiving shifter for shifting one bit by one bit serial data inputted from a receiving terminal RxD to convert the serial data to parallel data; and numeral 106, a receive data buffer for storing once the data converted into the parallel data by the receiving shifter 107 upon the completion of receiving.

Reference numeral 104 designates a status signal generating unit for generating the error contents of the receive data converted into the parallel data by the receiving shifter 107, the generated status signal being outputted to the status register 103.

Reference numeral 108 designates a reset signal generating circuit for generating a signal for resetting the status register 103 where a reset signal RESET is given from the CPU 100.

Figure 7:
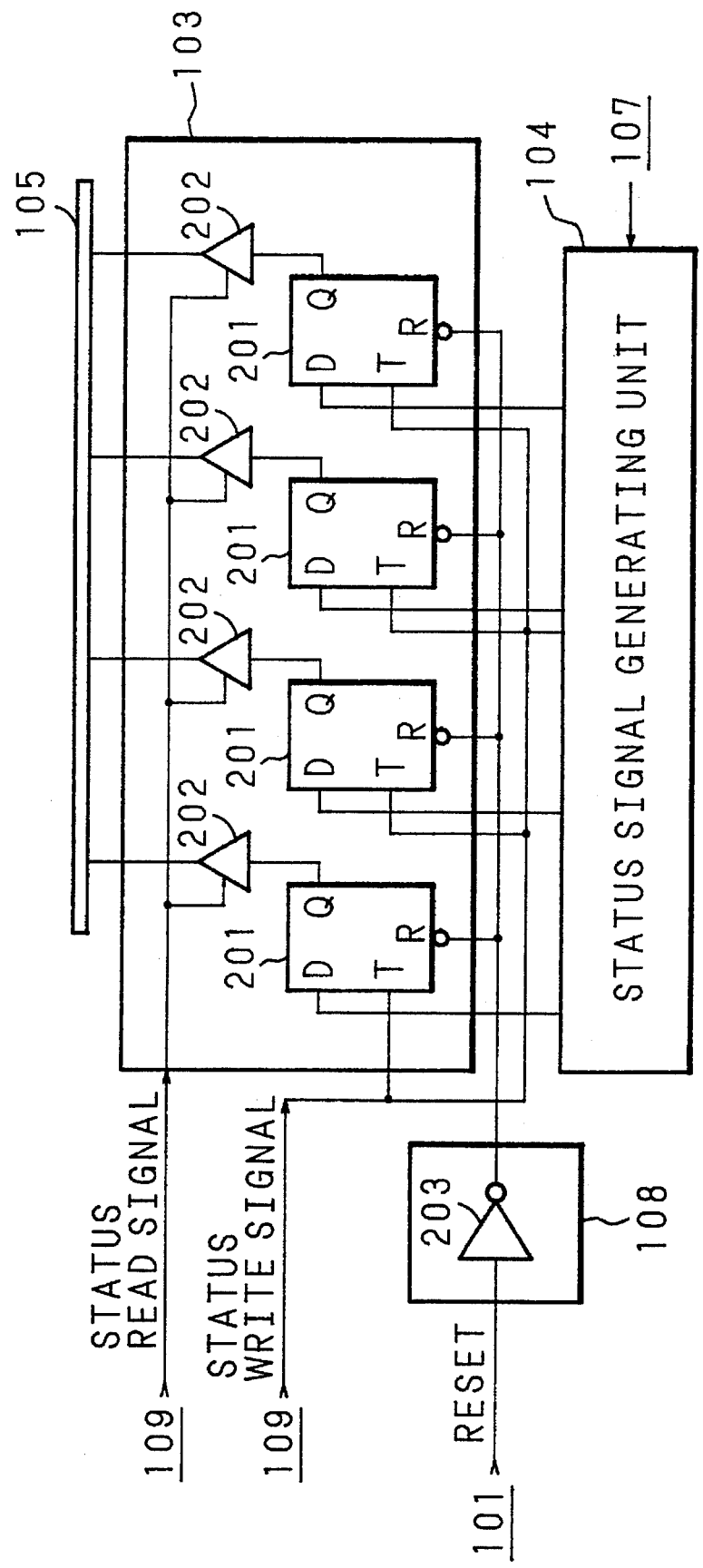
FIG. 7 is a block diagram showing a configuration example of a status register of the first embodiment of the serial data transfer apparatus of the present invention.

FIG. 7 is a block diagram showing a specific configuration example where the status register 103 of FIG. 6 consists of 4 bits.

In FIG. 7, reference numeral 201 designates a D-flip-flop for storing a status signal generated by the status signal generating unit 104 according to a status write signal given by a receiving control register 109.

Reference numeral 202 designates a tri-state buffer for outputting the stored values of the D-flip-flop 201 to the data bus 105 according to a status read signal outputted from the receiving control register 109.

Reference numeral 203 designates an inverter included in the reset signal generating circuit 108, which inverts the logic of the reset signal RESET outputted from the CPU 100 and gives the result to the status register 103.

Four combinations of the D-flip-flop 201 and the tri-state buffer 202 are included corresponding to the number of bits of the status register 103.

Specifically, the status signal generated by the status signal generating unit 104 is given to an input terminal D of each D-flip-flop 201; the status write signal outputted from the receiving control register 109, to an input terminal T; and the signal outputted from the reset signal generating circuit 108, to a negative logic reset terminal R. An output signal from an output terminal Q of each D-flip-flop 201 is given to an input terminal of the tri-state buffer 202.

Therefore, each D-flip-flop 201 is set by a significant signal from the reset signal generating circuit 108, and stores the value of a signal given from the status signal generating unit 107 to the input terminal D by a significant status write signal from the receiving control register 109. Then, a significant status read signal from the receiving control register 109 is given to each tri-state buffer 202, whereby the output signal from the output terminal Q of the D-flip-flop 201 to which each tri-state buffer 202 is connected is outputted to the data bus 105.

Now, a state in which each D-flip-flop 201 is set, that is, in which a significant signal is outputted from the output terminal Q becomes a state in which each error flag is set.

Figure 8:
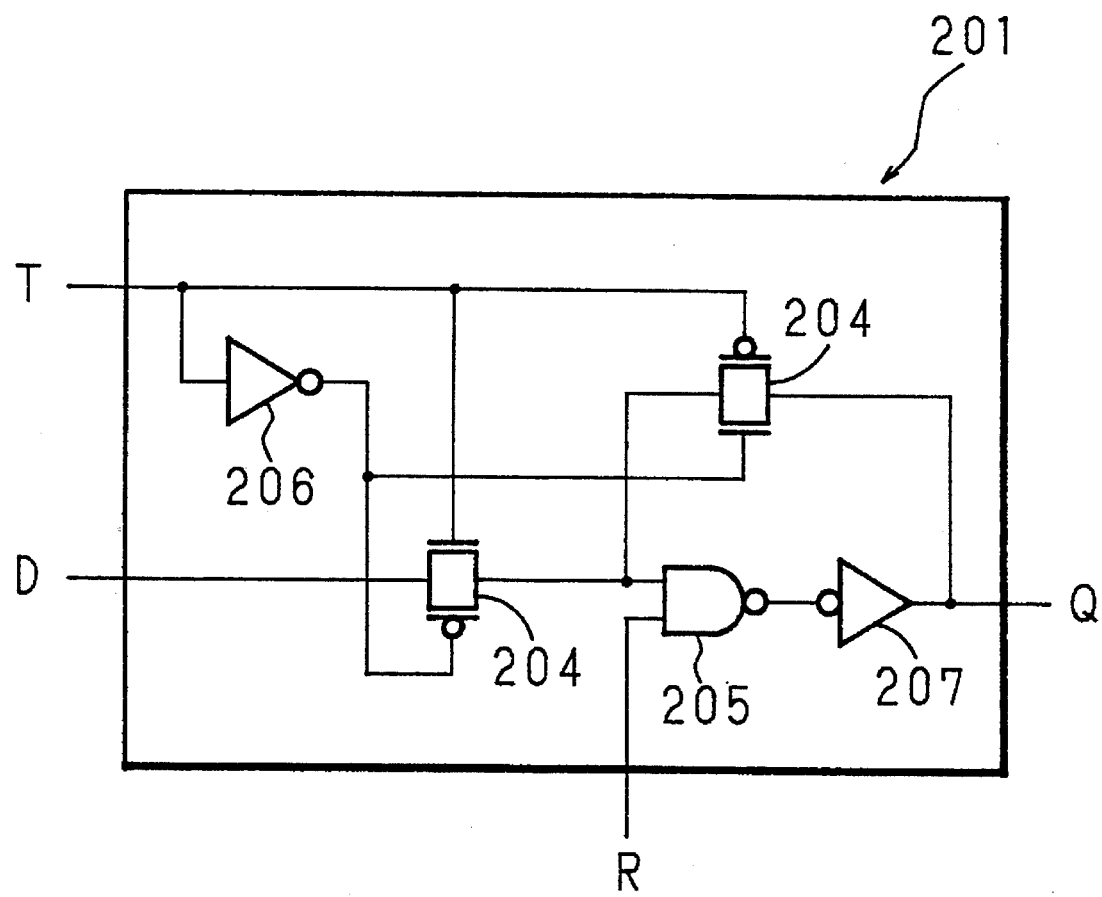
FIG. 8 is a circuit diagram showing a configuration example of a D-flip-flop functioning as a flag of the status register of the first embodiment of the serial data transfer apparatus, of the present invention.

FIG. 8 is a circuit diagram showing a configuration example of the D-flip-flop 201 of FIG. 7.

In FIG. 8, reference numeral 204 designates a transfer gate; numeral 205, a NAND circuit for inputting a signal outputted from the reset signal generating circuit 108; and numerals 206, 207 designate inverters.

Since the configuration shown in FIG. 8 is of a general D-flip-flop 201, its detailed description will be omitted.

Figure 9:
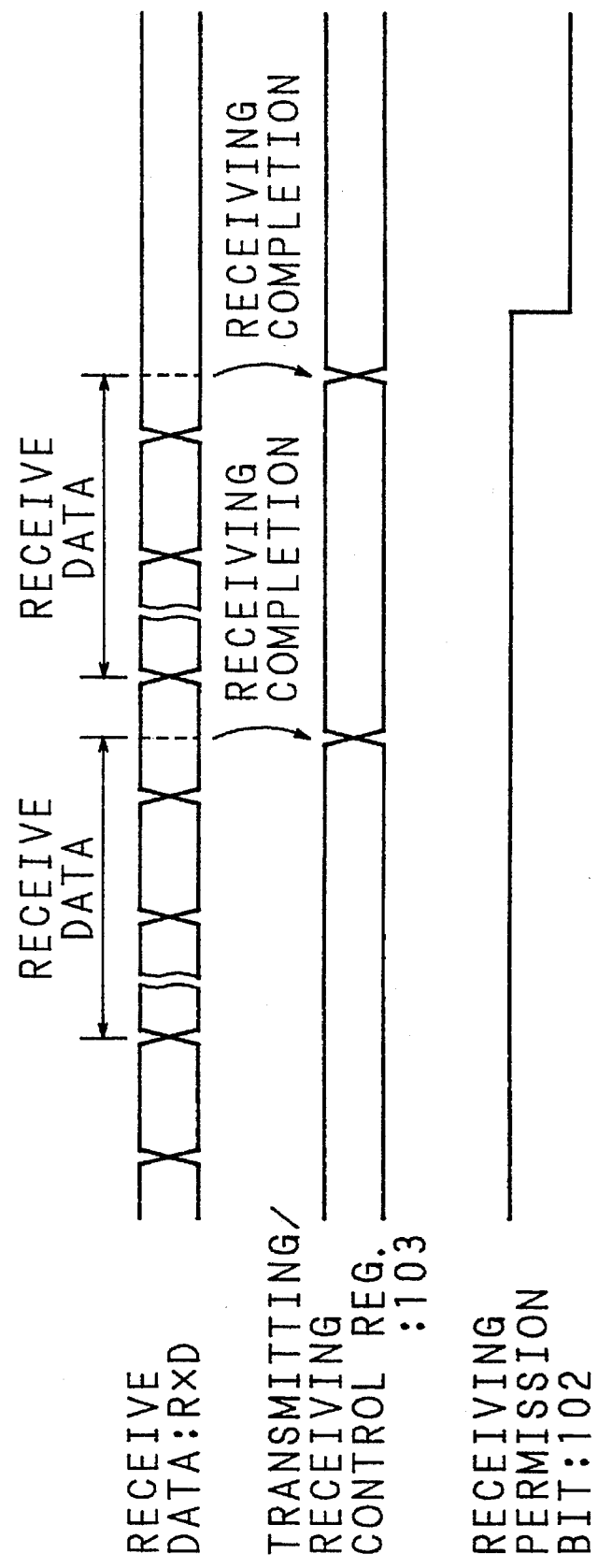
FIG. 9 is a timing chart showing an operating state of the first embodiment of the serial data transfer apparatus of the present invention.

FIG. 9 is a timing chart showing a state of the status register 103 where the receiving permission bit of the control register 102 is reset to "0".

The operation of the first embodiment of the present invention will be explained hereinafter.

At first, in an initialized state, that is, immediately after the reset signal RESET was input ted, the control register 102 and the status register 103 have been initialized, so that the receiving permission bit of the control register 102 and all error flags of 4 bits of the status register 103 have been reset to "0".

When the receiving permission bit of the control register 102 is set to "1", the receiving operation is started.

Serial receive data inputted from the receiving terminal RxD is shifted one bit by one bit by the receiving shifter 107 so as to be converted to parallel data. When receiving the last bit of the serial receive data, the receiving shifter 107 inputs the receive data converted to parallel into the receive data buffer 106.

On the other hand, the status signal generating circuit 104 generates status information, that is, information on the presence/absence of error, based on the receive data, and writes the error information of the receive data to the status register 103 according to the status write signal outputted from the receiving control register 109.

The CPU 100, when receiving the interruption of receiving completion from the receiving control register 109, reads both the receive data from the receive data buffer 106 and the error information of receive data from the status register 103, and loads them into the data bus 105. The receive data and the error information loaded into the data bus 105 are transferred to tile CPU 100.

Thereafter, in a similar manner, the receiving of the next serial receive data is started. The receive data which has been converted from serial data into parallel data by the receiving shifter 107 is written to the receive data buffer 106, while the error information having been generated by the status signal generating unit 104 is written to the status register 103.

Now, after the completion of one receiving cycle of the receive data, when the receiving permission bit of the control register 102 has been set, the receiving of the next serial data will be started. Therefore, when the receiving operation must be stopped, it is necessary to prevent the receiving of the next serial data. Specifically, immediately after the completion of one receiving cycle, the receiving permission bit of the control register 102 must be reset to "0".

In this case, as shown in the timing chart of FIG. 9, in the serial data transfer apparatus 101 of the present invention, when the receiving permission bit of the control register 102 is reset to "0", the error information of the status register 103 is not reset to "0". In other words, the apparatus is configured so that even when the receiving permission bit of the control register 102 is reset to "0" by an instruction from the CPU 100, the content of the status register 103 is maintained.

As described above, the serial data transfer apparatus 101 of the first embodiment of the present invention is configured so that even where the receiving permission bit of the control register 102 is reset to "0", the reset signal RESET of the status register 103 is not generated, whereby the information of the status register 103 is protected from being destroyed. This allows the receiving permission bit of the control register 102 to be reset independently of the read of the status register 103, so that in preparing a program for controlling the serial data transfer apparatus, no limitation is imposed on the sequence for the read of the status register 103 and the reset of receiving permission bit of the control register 102, thereby allowing a flexible programming.

[Second Embodiment]

FIG. 10 through FIG. 13 show a second embodiment of the present invention.

Figure 10:
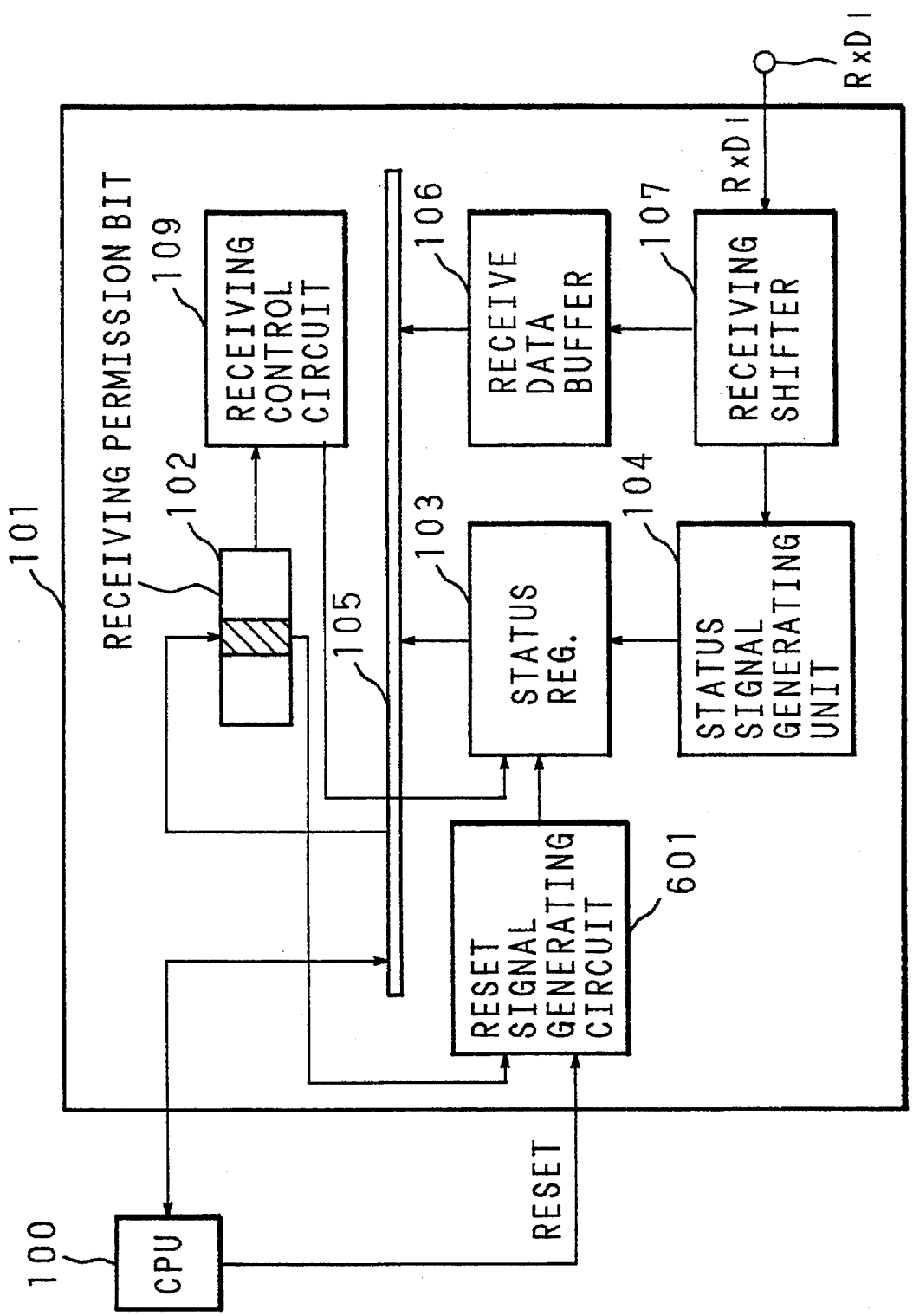
FIG. 10 is a block diagram of principal portion showing a configuration example of a second embodiment of a serial data transfer apparatus of the present invention.

FIG. 10 is a block diagram showing an internal configuration of the second embodiment of the serial data transfer apparatus 101 of the present invention.

In FIG. 10, reference numeral 601 designates a reset signal generating circuit, which corresponds to the reset signal generating circuit designated by reference numeral 108 in the block diagram of FIG. 6 of the above-mentioned first embodiment. In the configuration of the second embodiment shown in FIG. 10, the value of the receiving permission bit of the control register 102 is given to the reset signal generating circuit 601.

The other configuration which is similar to the above-mentioned block diagram of FIG. 5 will be omitted.

Figure 11:
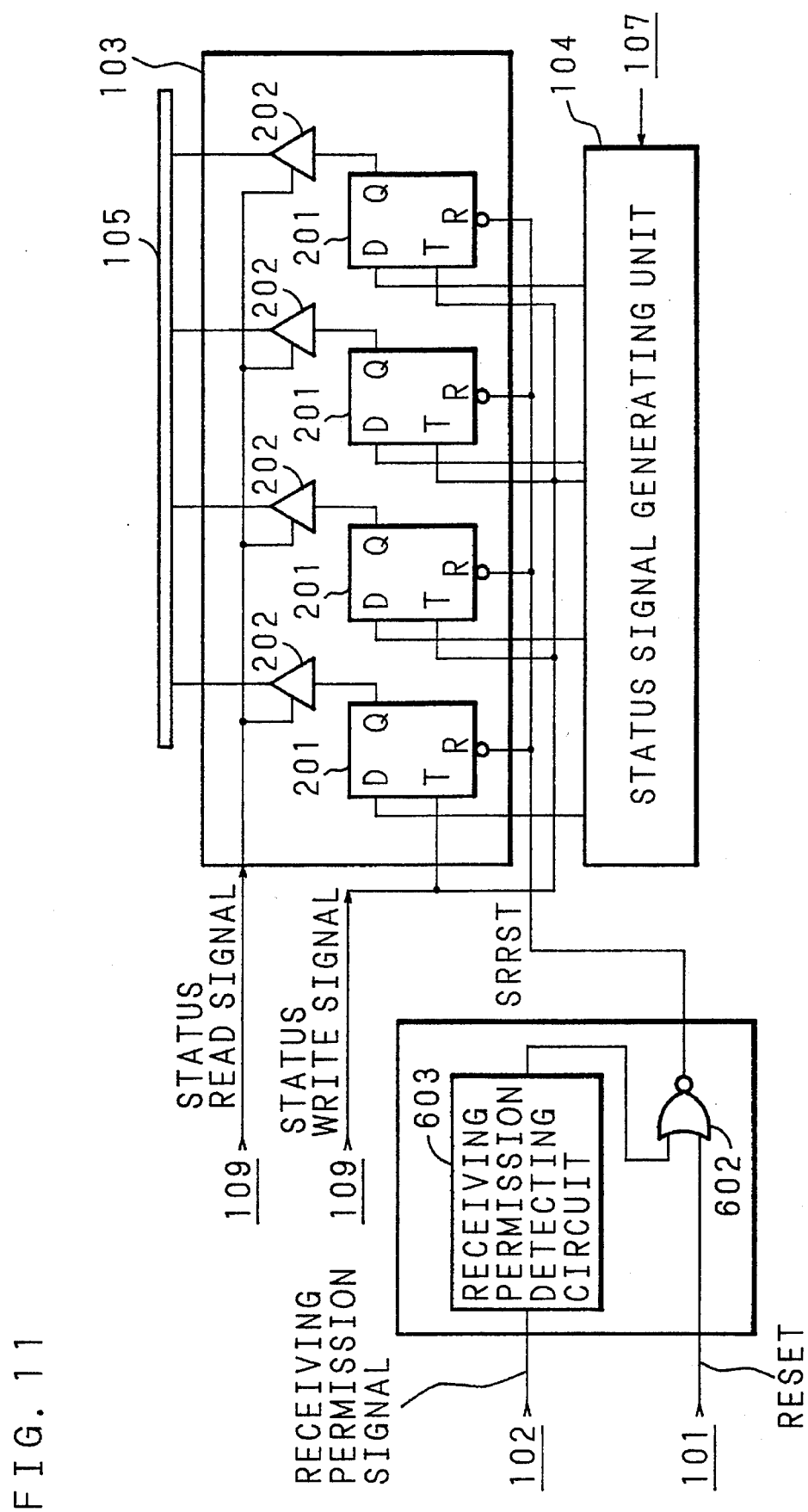
FIG. 11 is a circuit diagram showing a configuration example of a D-flip-flop functioning as a flag of the status register of the second embodiment of the serial data transfer apparatus of the present invention.

FIG. 11 is a block diagram showing a specific configuration example of the status register 103 consisting of 4 bits of FIG. 10, and a configuration example of the reset signal generating circuit 601.

in FIG. 11, the configuration of the status register 103 and the status signal generating unit 104 designated by reference numerals 103 and 104, respectively, is the same as with the above-mentioned first embodiment shown in the block diagram of FIG. 7 The configuration in the second embodiment different from the first embodiment is of the reset signal generating circuit 601.

Reference numeral 603 designates a receiving permission detecting circuit which detects inputting of a receiving permission signal outputted in case where the receiving permission bit of the control register 102 has been set. Reference numeral 602 designates a NOR circuit for obtaining logical sum between the reset signal RESET outputted from the CPU 100 and an output signal of the above-mentioned receiving permission detecting circuit 603. An output signal of the NOR circuit 602 as a status register reset signal SRRST is given to the reset terminal R of each D-flip-flop 201 of the status register 103.

Figure 12:
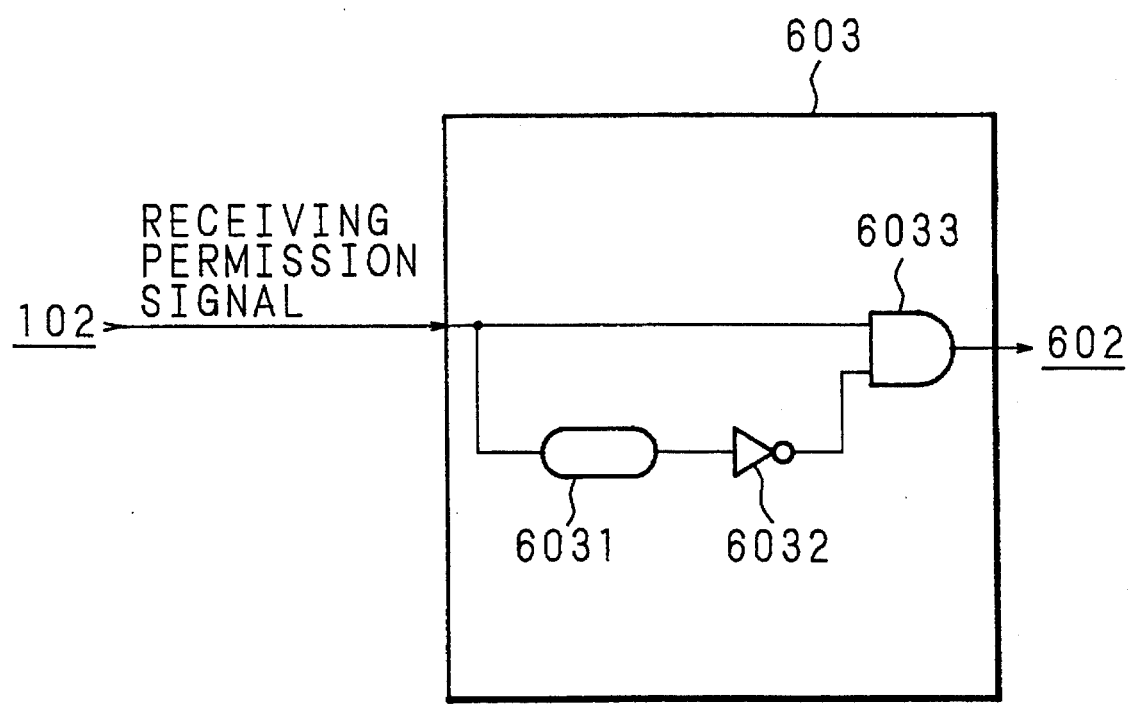
FIG. 12 is a circuit diagram showing a configuration example of a reset signal generating circuit of the second embodiment of the serial data transfer apparatus of the present invention.

FIG. 12 is a circuit diagram showing a configuration example of the receiving permission detecting circuit 603 of FIG. 11.

In FIG. 12, reference numeral 6031 designates a delay circuit which delays the receiving permission signal outputted from the control register 102; numeral 6032, an inverter for inverting the logic of an output signal from the delay circuit 6031; and numeral 6033, an AND circuit for obtaining logical product between an output signal of the delay circuit 6031 inverted by the inverter 6032 and the receiving permission signal directly inputted.

In the receiving permission detecting circuit 603 having such configuration, where a receiving permission signal of an "H" level is inputted, a waveform thereof is outputted intact through the AND circuit 6033, and a waveform delayed by the delay circuit 6031 is inverted by the inverter 6032 and inputted into the AND circuit 6033, thereby generating a pulse having a width equal to the delay time of the delay circuit 6031.

The operation of the second embodiment of the present invention will be explained hereinafter.

The second embodiment of the present invention performs receiving operation similar to that of the above-mentioned first embodiment of the present invention. Therefore, a case where the operation of the second embodiment is different from that of the above-mentioned first embodiment, specifically, a case where after the receiving operation is once terminated, the receiving operation is started again will be explained with reference to a timing chart of FIG. 13.

After the receiving operation is once stopped, the receiving operation is started again, status information of receive data having been received previously, that is, error information is required to be cleared. Thus, the second embodiment is configured so that where the receiving permission bit of the control register 102 is set to "1", the stored value of the status register having been received previously is cleared.

The control register 102, when the receiving permission bit is set, outputs the receiving permission signal to the reset signal generating circuit 601. When the receiving permission signal is input ted into the receiving permission detecting circuit 603 of the reset signal generating circuit 601, as described above, a pulse is generated as a detection signal. The pulse of the detection signal outputted from the receiving permission detecting circuit 603 is outputted through the NOR circuit 602 as a status register reset signal SRRST The status register reset signal SRRST is inputted to the reset terminal R of each D-flip-flop 201 of the status register 103, whereby when the receiving operation is started again, the contents previously stored in the status register 103 are cleared.

As described above, the serial data transfer apparatus 101 of the second embodiment of the present invention is configured so that when the receiving permission bit of the control register 102 is set to "1" to start again the receiving operation, unnecessary contents indicating the state of old receive data stored in the status register 103 are cleared.

This makes it unnecessary to clear the unnecessary contents indicating the state of old receive data stored in the status register 103 each time when the receiving operation is started again.

Also, the second embodiment, as with the above-mentioned first embodiment, is configured so that by the setting of the receiving permission bit of the control register, the status register value of the receive data is not cleared, so that in programming for controlling the serial data transfer apparatus, no limitation is imposed on the sequence for the read of the status register 103 and the reset of receiving permission bit of the control register 102, thereby allowing a free programming.

As this invention may be embodied in several forms without departing from the spirit of essential characteristics thereof, the present embodiment is therefore illustrative and not restrictive, since the scope of the invention is defined by the appended claims rattler than by the description preceding them, and all changes that fall within meets and bounds of the claims, or equivalence of such meets and bounds thereof are therefore intended to be embraced by the claims.

What is claimed is:

1. A serial data transfer apparatus for transferring serial data, comprising:

a receiving shifter for storing each bit of received serial data while sequentially shifting each bit to convert the serial data into parallel data;

a control register for storing values of a receiving permission bit, one of said values permitting data to be received and another of said values preventing data from being received;

a status signal generating unit for generating error information of the received data;

a status register for storing the error information generated by said status signal generating unit;

a receiving control register for controlling said status register to allow the error information to be stored; and a reset signal generating circuit for initializing stored values of said status register;

wherein said reset signal generating circuit comprises means responsive to a RESET instruction from a central processing unit (CPU) for preventing a reset of said status register when the receiving permission bit is reset to a value preventing data from being received, whereby the error information stored in said status register is maintained.

2. The serial data transfer apparatus of claim 1, wherein said means for preventing the reset of said status register includes an inverter for inverting the logic of said RESET instruction from said CPU.

3. A serial data transfer apparatus for transferring serial data, comprising:

a receiving shifter for storing each bit of received serial data while sequentially shifting each bit to convert the serial data into parallel data;

a control register for storing values of a receiving permission bit, one of said values permitting data to be received and another of said values preventing data from being received;

a status signal generating unit for generating error information of the received data;

a status register for storing the error information generated by said status signal generating unit;

a receiving control register for controlling said status register to allow the error information to be stored; and a reset signal generating circuit for initializing stored values of said status register, comprising, a receiving permission detecting circuit for detecting that said control register has stored a bit value for permitting data to be received, and means for initializing the stored values of said status register when said receiving permission detecting circuit detects that said control register has stored said bit value for permitting data to be received, whereby error information previously stored in said status register is cleared.

4. The serial data transfer apparatus of claim 3, wherein said reset signal generating circuit is responsive to said bit value for permitting data to be received from said control register and to a RESET instruction from a central processing unit (CPU), for providing a status register reset signal to said status register.

5. The serial data transfer apparatus of claim 4, wherein said receiving permission detecting circuit includes means responsive to said bit value for permitting data to be received for providing a detection pulse, and wherein said reset signal generating circuit further includes a NOR circuit for obtaining a logical sum of said detection pulse and said RESET instruction, for providing said status register reset signal.

6. A serial data transfer apparatus for transferring serial data, comprising:

a receiving shifter for storing each bit of received serial data while sequentially shifting each bit to convert the serial data into parallel data;

a control register for storing values of a receiving permission bit, one of said values permitting data to be received and another of said values preventing data from being received;

a status signal generating unit for generating error information of the received data;

a status register for storing the error information generated by said status signal generating unit;

a receiving control register for controlling said status register to allow the error information to be stored; and a reset signal generating circuit for initializing stored values of said status register comprising, a receiving permission detecting circuit for detecting that said control register has stored a bit value for permitting data to be received, means for initializing the stored value of said status register when the receiving permission bit is reset to a value preventing data from being received, whereby the error information stored in said status register is maintained, and means for initializing the stored values of said status register when said receiving permission detecting circuit detects that said control register has stored a new bit value for permitting data to be received.

* * * * *